United States Patent
Gonzalez

(10) Patent No.: US 8,893,097 B2
(45) Date of Patent: *Nov. 18, 2014

(54) TOOL CONFIGURED TO BUILD CROSS-BROWSER TOOLBAR

(71) Applicant: Visicom Media Inc., Brossard (CA)

(72) Inventor: Miguel Enrique Cepero Gonzalez, Brossard (CA)

(73) Assignee: Visicom Media Inc., Brossard (Quebec) (CA)

(*) Notice: Subject to any disclaimer, the term of this patent is extended or adjusted under 35 U.S.C. 154(b) by 0 days.

This patent is subject to a terminal disclaimer.

(21) Appl. No.: 13/690,236

(22) Filed: Nov. 30, 2012

(65) Prior Publication Data

US 2013/0091418 A1 Apr. 11, 2013

Related U.S. Application Data

(63) Continuation of application No. 12/270,421, filed on Nov. 13, 2008, now Pat. No. 8,341,608.

(51) Int. Cl.
*G06F 9/45* (2006.01)

(52) U.S. Cl.
USPC ............................ 717/140; 717/139; 717/141

(58) Field of Classification Search
USPC .................................................. 717/136–143
IPC ..................... G06F 20/11,20/22, 11/3003, 8/37, G06F 9/45, 17/2705, 11/303
See application file for complete search history.

(56) References Cited

U.S. PATENT DOCUMENTS

| | | |
|---|---|---|
| 6,675,230 B1 | 1/2004 | Lewallen |
| 6,714,928 B1 | 3/2004 | Calow |
| 6,725,424 B1 | 4/2004 | Schwerdtfeger et al. |
| 6,973,625 B1 | 12/2005 | Lupo et al. |
| 7,054,952 B1 | 5/2006 | Schwerdtfeger et al. |
| 7,096,445 B1 | 8/2006 | Pucci et al. |
| 7,305,667 B1 | 12/2007 | Saulys et al. |
| 7,340,728 B2 | 3/2008 | Kutter |
| 7,464,381 B1 | 12/2008 | Nickerson et al. |
| 7,467,375 B2 * | 12/2008 | Tondreau et al. ............. 717/137 |

(Continued)

FOREIGN PATENT DOCUMENTS

WO 2007/038587 4/2007

OTHER PUBLICATIONS

Dhawan et al,"Fathom: A Browser-based Network Measurement Platform", ACM, pp. 73-86, 2012.*

(Continued)

*Primary Examiner* — Anil Khatri
(74) *Attorney, Agent, or Firm* — M&B IP Analysts, LLC

(57) ABSTRACT

A tool configured to build a cross-browser toolbar is provided. The tool includes a processor; and a memory coupled to the processor and configured to store at least instructions for execution of a wizard program by the processor, the wizard program causes to: receive an input identifying at least user interface elements and event handlers respective of the user interface elements, the input further identifies at least two different types of a web browser on which the toolbar can be executed; generate respective of the received input a toolbar render object, a script file, and at least one toolbar library for each type of web browser; and compile the toolbar render object, the script file, and the least one toolbar library into an installer file.

17 Claims, 3 Drawing Sheets

(56) References Cited

U.S. PATENT DOCUMENTS

| | | | |
|---|---|---|---|
| 7,487,447 B1 | 2/2009 | Jerger | |
| 7,516,447 B2 * | 4/2009 | Marvin et al. | 717/140 |
| 7,539,982 B2 | 5/2009 | Stuart | |
| 7,565,647 B2 * | 7/2009 | Davidov et al. | 717/140 |
| 7,574,692 B2 | 8/2009 | Herscu | |
| 7,596,782 B2 * | 9/2009 | Ebbo et al. | 717/141 |
| 7,614,005 B2 | 11/2009 | Feigembaum | |
| 7,665,073 B2 | 2/2010 | Meijer et al. | |
| 7,707,196 B2 | 4/2010 | Bellaiche et al. | |
| 7,765,523 B2 * | 7/2010 | Kooy | 717/106 |
| 7,770,159 B2 * | 8/2010 | Pepin et al. | 717/138 |
| 7,798,417 B2 | 9/2010 | Snyder et al. | |
| 7,844,956 B2 | 11/2010 | Rojer | |
| 7,853,936 B2 | 12/2010 | Levi | |
| 7,895,570 B2 | 2/2011 | Gibson et al. | |
| 7,913,234 B2 * | 3/2011 | Neil et al. | 717/136 |
| 7,921,415 B1 * | 4/2011 | Bodell et al. | 717/139 |
| 7,954,094 B2 * | 5/2011 | Cascaval et al. | 717/145 |
| 7,958,492 B2 | 6/2011 | Schneider et al. | |
| 8,196,121 B2 | 6/2012 | Peshansky et al. | |
| 8,201,153 B2 | 6/2012 | Backhouse et al. | |
| 8,281,287 B2 * | 10/2012 | Finocchio | 717/140 |
| 8,316,356 B2 * | 11/2012 | Frey | 717/139 |
| 8,375,362 B1 * | 2/2013 | Brette et al. | 717/121 |
| 8,464,229 B2 * | 6/2013 | Thomson et al. | 717/140 |
| 8,645,929 B2 * | 2/2014 | Chamieh et al. | 717/139 |
| 2004/0061720 A1 | 4/2004 | Weber | |
| 2006/0136843 A1 | 6/2006 | Shafron | |
| 2007/0157118 A1 | 7/2007 | Wuttke | |
| 2007/0192725 A1 | 8/2007 | Chen | |
| 2008/0155425 A1 | 6/2008 | Murthy et al. | |
| 2008/0163090 A1 | 7/2008 | Cortright | |

OTHER PUBLICATIONS

Billingsley et al, "Improving UPC Productivity via Integrated Development Tools", ACM, pp. 1-9, 2010.*

Lu et al, "Polonius: A Wizard of Oz Interface for HRI Experiments", ACM, pp. 197-198, 2011.*

Zhu et al, "Testing a Web Application Involving Web Browser Interaction", IEEE, pp. 589-594, 2009.*

Suzuki et al., "Toward the interoperable software design models: quartet of UML, XML, DOM and CORBA", IEEE, pp. 163-172, 1999.

Gonzalez et al., "Platform independent accessibility API: accessible document object model", ACM pp. 63-71, 2005.

Rozinajova et al., "One approach to HTML wrappers creation: using document object model tree", ACM pp. 1-6, 2009.

Ghiani et al., "Push and pull of web user interfaces in multi-device environments" ACM AVI pp. 10-17, 2012.

* cited by examiner

TOOL CONFIGURED TO BUILD CROSS-BROWSER TOOLBAR

CROSS REFERENCE TO RELATED APPLICATIONS

This patent application is a continuation of patent application Ser. No. 12/270,421, now allowed, filed on Nov. 13, 2008, which is hereby incorporated by reference for all that it contains.

TECHNICAL FIELD

This invention generally relates to browser extensions.

BACKGROUND

Web browsers are software applications that enable the viewing of information accessible on the World Wide Web (or Web). At its most basic, the Web is a collection of documents written using programming languages that web browsers can interpret. Such languages include, for example, a hyper text markup language (HTML), an eXtensible markup language (XML), and the like. Microsoft Internet Explorer®, Mozilla Firefox®, Safari®, and Opera® are just to name a few examples of web browsers.

Browser extensions are applications such as plug-ins or add-ons that are downloaded and installed on an individual computing device on which a web browser is operating. The browser extensions are compiled separately for each type of web browser. A prime example for a browser extension is a downloadable toolbar. When installed, a toolbar allows users to customize their browsing experience.

The process of creating a downloadable toolbar includes developing a software application compatible with a specific browser type and storing an executable application in a web server. The software application embodying the toolbar typically includes functional buttons, search windows, and application programming interfaces (APIs) for other plug-ins and interfaces. A user may download the executable application from a web server to a local computing device and run the application thereon, causing the toolbar to be integrated in the web browser.

There are some disadvantages with the current process of developing toolbars. Such a process requires programming and compiling software code for each type of web browser. Thus, a new version of the same toolbar should be developed for each web browser's type. This is typically performed by software developers who specialized in developing toolbars. Thus, existing toolbars are proprietary and in most cases not extensible.

Therefore, it would be advantageous to provide an automated solution for generating toolbars. It would be further advantageous to provide a solution for generating cross-browser toolbars.

SUMMARY

Certain embodiments include a method for rendering a cross-platform toolbar. The method comprises providing a toolbar document object (TDO), wherein the TDO includes elements enabling cross-browser interoperability; and translating, at runtime, the TDO to a specific-browser document object model (DOM) of a web browser type on which the toolbar is being rendered.

Certain embodiments also include a method for generating a cross-browser toolbar. The method comprises generating a toolbar render object defining at least user interface elements of the cross-browser toolbar; generating a script file defining at least event handlers associated with the user interface elements; generating toolbar libraries including at least application programming interfaces (APIs) and script files supporting a specific web browser type; assigning a unique dynamic-link library (DLL) file with the toolbar libraries and the script file; and compiling the toolbar render object, the script file, the toolbar libraries, and the DLL file into an installer file adapted to enable the installation of the cross-browser toolbar in the specific web browser type.

Certain embodiments further include a cross-platform toolbar. The cross-platform toolbar comprises a toolbar render object defining at least user interface elements of the cross-browser toolbar; a script file defining at least event handlers associated with the user interface elements; toolbar libraries including at least application programming interfaces (APIs) and script files supporting a specific web browser type; and a unique dynamic-link library (DLL) file assigned with the toolbar libraries and the script file.

BRIEF DESCRIPTION OF THE DRAWINGS

The subject matter that is regarded as the invention is particularly pointed out and distinctly claimed in the claims at the conclusion of the specification. The foregoing and other objects, features and advantages of the invention will be apparent from the following detailed description taken in conjunction with the accompanying drawings.

DETAILED DESCRIPTION

Figure 1:
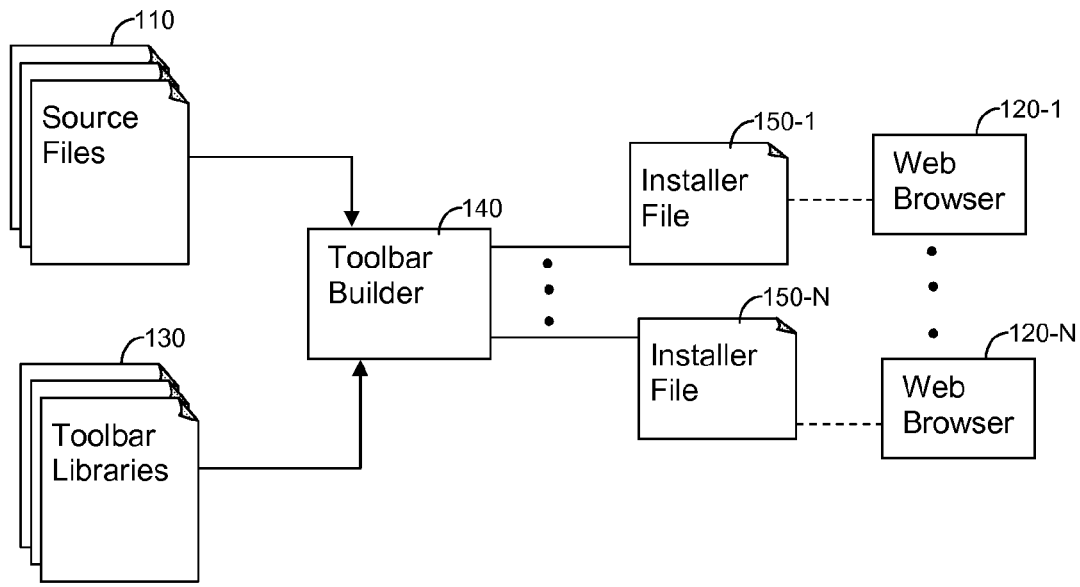
FIG. 1 is a diagram illustrating the process of creating a cross-browser toolbar utilized in accordance with the principles of the invention.

It is important to note that the embodiments disclosed by the invention are only examples of the many advantageous uses of the innovative teachings herein. In general, statements made in the specification of the present application do not necessarily limit any of the various claimed inventions. Moreover, some statements may apply to some inventive features but not to others. In general, unless otherwise indicated, singular elements may be in plural and vice versa with no loss of generality. In the drawings, like numerals refer to like parts through several views.

FIG. 1 shows an exemplary diagram illustrating the process of creating a cross-browser toolbar implemented according to the principles of the invention. The process includes generating a toolbar which can be executed on any of web browsers 120-1 through 120-N. The toolbar functionality and appearance are defined by one or more source files 110. In one embodiment, the source files 110 include one or more XML files that characterize user interface elements (e.g., buttons, menus, etc.) script files that set the functionality of the user interface elements using event handlers. The web browsers 120 are of different types and include, but are not limited to, Microsoft Internet Explorer®, Mozilla Firefox®, Opera®, Safari®, and the like.

Other files required for generating the cross-browser toolbar are stored in toolbar libraries 130. The libraries 130 contain at least files that provide low level APIs as well as XML and script files to support the different types of browsers 120. A toolbar builder 140 generates toolbar installer files 150-1 though 150-N, each of which is targeted to a different type of a web browser 120. For example, an installer file 150-1 may be installed and executed over an Internet Explorer® browser while an installer file 150-N may perform the same over a Firefox® browser. The toolbar builder 140 creates a specific installer file 150 by selecting files from the toolbar libraries 130 which are executable over a specific type of a browser 120 and assigning unique dynamic-link library (DLL) files with the scripts in source files 110 and relevant portions of the libraries 130. For instance, to generate the installer file 150-1 only files in the libraries 130 executable over an Internet Explorer® browser are selected. In addition, the toolbar builder 140 encapsulates these relevant files from the libraries 130, the source files 110 and optionally a unique DLL file into a downloadable file. For example, an installer file 150-N targeted to a Firefox® browser may not include a DLL file. In another embodiment the toolbar builder 140 may further output update files (not shown) including new elements and/or fixes that do not exist in previous versions of an already installed toolbar.

In a preferred embodiment of the invention, the toolbar builder 140 may be a wizard application that allows developing a toolbar without coding, writing or providing any of the source files 110. In such embodiment a wizard executed by the toolbar builder 140 prompts the users to select user interface elements and event handlers of such elements through a graphical user interface (GUI). Based on the user selections the wizard generates the source files. The user is also prompted to select the type of web browsers on which he/she would like to run the toolbar. Thereafter, the toolbar builder 140 creates the installer files 150, each of which includes the self-generated source files and targeted to a different type of a browser.

Figure 2:
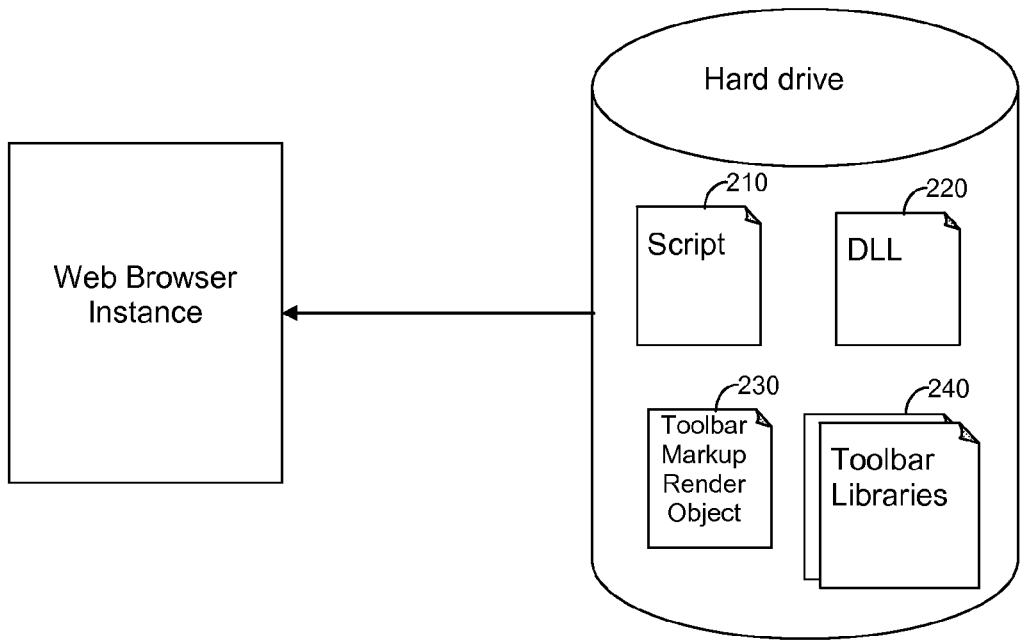
FIG. 2 illustrates the files used for executing a cross-browser toolbar over a web browser instance.

Users can download the installer files 150 to their computer's local hard drive and install, using an installation program, the toolbar on their browsers 120. As shown in FIG. 2 the installation program outputs a script file 210, a DLL file 220, a toolbar render object 230, and toolbar libraries 240 that include portions of the libraries 130 relevant to the target browser. In one embodiment the script file 210, the DLL file 220 the toolbar render object 230, and the toolbar libraries 240 output by the installation program may be encrypted. It should be noted that the DLL file 220 and a toolbar render object 230 are dependent on the type of browser. As an example, for Internet Explorer®, the DLL file 220 enables the interaction with the toolbar at runtime and the toolbar render object 230 is a HTML render (i.e., capable of rendering HTML elements). In a Firefox® environment, the toolbar render object 230 is an XML user interface language (XUL) render (i.e., capable of rendering XUL elements) and the DLL file 220 is a binary DLL that provides security features.

In accordance with the embodiments disclosed herein, the generated toolbar is based on a toolbar document object (TDO) having a structure similar to a standard document object model (DOM) but with enhanced functionality. Generally, most types of browsers support a DOM which is an API for HTML and XML documents. The DOM provides a structural representation of the document, enabling modification its content and visual presentation. That is, a DOM connects web pages to scripts or applications.

In an embodiment of the invention, the TDO has a tree representation where each node in the tree is a user-interface element. These elements support standard tags (e.g., XUL tags) and special tags. The special tags are a set of tags designed to provide enhanced toolbar functions, referred to as special functions. Examples for such tags include, but are not limited to, a search-bar for providing a search engine input field, a RSS button for accessing RSS feeds, a web inspector button for performing background anti-phishing checks, a widget menu popup providing a list of widgets, and so on. A special tag may include a set of attributes allowing for customizing a special function defined by the special tag. Such attributes may include, but are not limited to, on-get-options, verifying-image, low-risk-image, high-risk-image, verified-image, white-list-image, black-list-image, no-rating-image, on-get-options, on-add-widget, on-widget-done, on-remove-widget, on-get-prefpane, and so on. In one embodiment the special tags may be XML-based tags. The special tags are stored in the toolbar libraries 240. The set of special tags can be extended by developers who may provide their own set of tags and functions.

In accordance with an embodiment of the invention, one of the elements of a TDO is a widget which may be an application or a control executed from a toolbar. A toolbar can be pre-installed with a list of widgets or such widgets may be added to the toolbar by dragging a widget from a central repository and dropping the widget to the toolbar. Widgets may include, but are not limited to, a media player, an online game, an online interactive program, visual animations, and so on.

Figure 3:
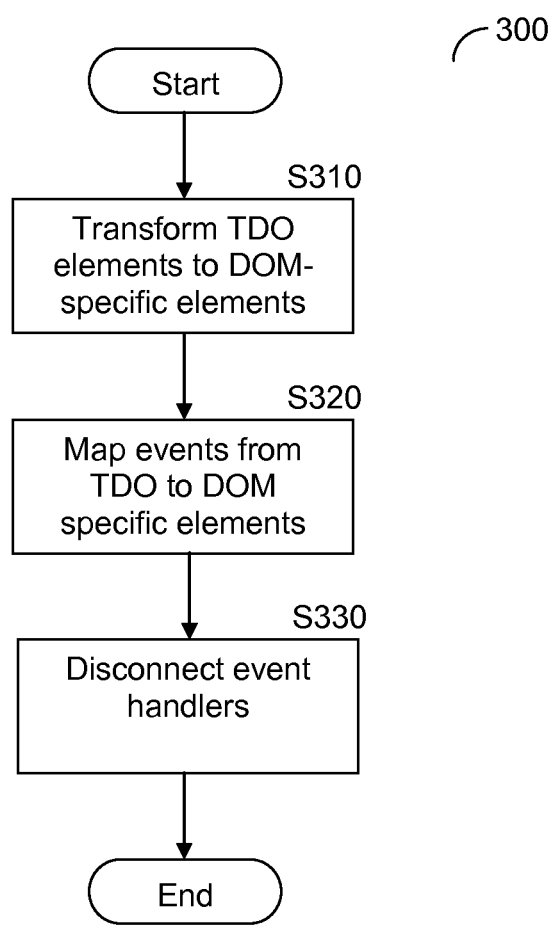
FIG. 3 is a flowchart describing the process of translating a TDO to a browser-specific DOM at runtime as implemented in accordance with an embodiment of the invention.

TDO and DOM are memory structures created at runtime in a local memory (of a computing device) allocated for the execution of a browser. As mentioned above the execution of a toolbar generated in accordance with the principles of the invention is allowed by translating the TDO to a browser-specific DOM of a target browser at runtime. This process is further illustrated using a flowchart 300 shown in FIG. 3.

At S310, TDO elements are translated into one or more browser-specific DOM elements. For instance, when targeting a HTML DOM (for Internet Explorer®), a TDO toolbar button element is rendered by a HTML table, which contains specific table cell elements for a button's border, a icon, label, and button's dropdown area. As another example, in a Firefox® browser, a button element defined in the TDO is rendered as a single XUL DOM element of type 'toolbarbutton'. At S320, event handlers are mapped from events of the TDO to events of the browser-specific DOM. The events may be triggered by an input device (e.g., a mouse, a keyboard, etc.). Step S320 is performed after rendering the browser-specific DOM in order to increase the performance in cases of complex user interfaces. This also allows tracking memory management by determining which events are connected to ensure that such events are later properly disconnected, thereby breaking circular dependencies resulting in memory leaks in browser-specific DOMs. At S330, when TDO elements are discarded, circular dependencies and script closures on event handlers are disconnected. This ensures that the memory can be properly reclaimed by a browser-specific garbage collector.

Figure 4:
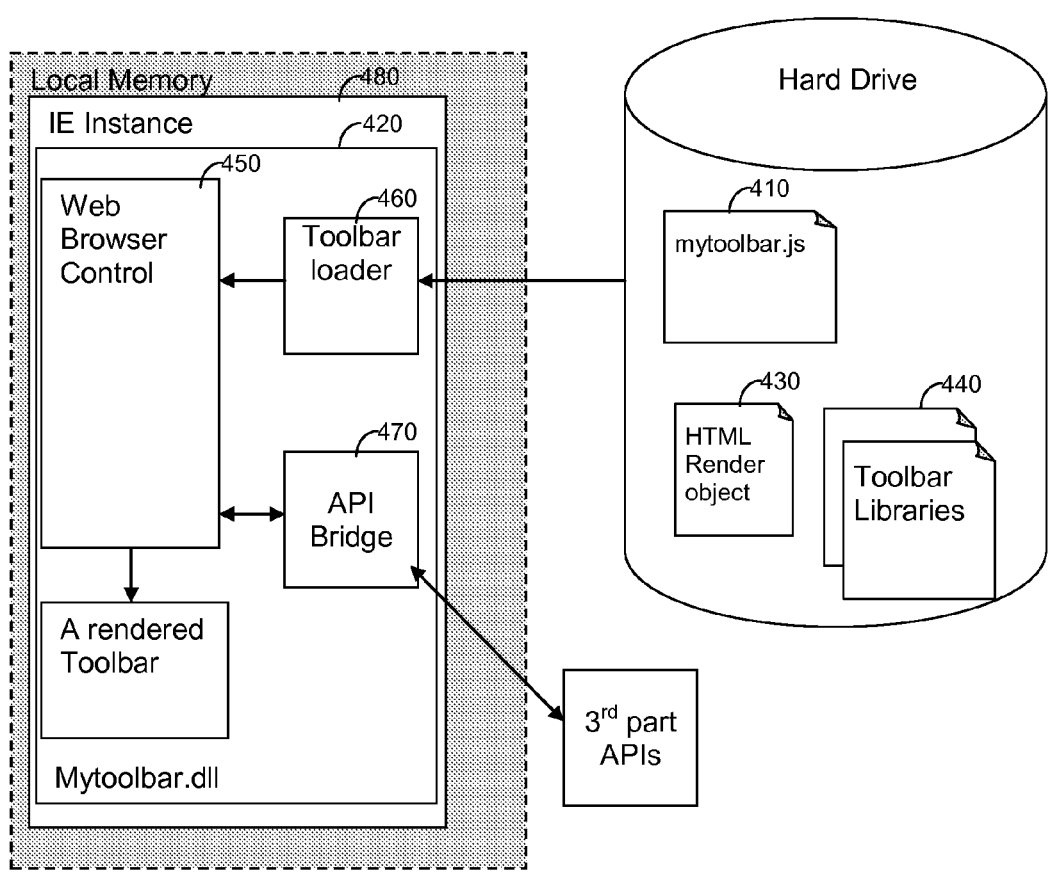
FIG. 4 is a diagram useful for describing the process of executing a toolbar over an Internet Explorer® (IE) browser as implemented in accordance with an embodiment of the invention.

FIG. 4 shows an exemplary diagram useful in describing the process of executing a toolbar over an Internet Explorer® (IE) browser implemented in accordance with an embodiment of the invention. The toolbar "mytoolbar" is constructed using the toolbar builder 140 and after installation a JavaScript file "mytoolbar.js" 410, a DLL file "mytoolbar.dll" 420, a HTML render object 430 and as toolbar libraries 440 are stored in a local hard drive.

At runtime, a DLL file 420 is loaded to an instance 480 of an IE browser. The DLL 420 manages a web-browser control 450, a toolbar loader 460, and an API bridge 470. The control 450 hosts the TDO and allows rendering the toolbar using the process described in detail above. The API bridge 470 provides an interface for communicating with other software applications running on the local computing device. In accordance with one embodiment, the toolbar loader 460 is adapted to support a "chrome://" protocol by providing a mechanism to enable "chrome://" protocol functionality in an IE instance 480 that executes the toolbar. For example, this allows to chrome URLs look and perform as same as in a Firefox® browser, thereby achieving cross-browser interoperability. It should be appreciated by one of ordinary skill in the art that the "chrome://" protocol is a proprietary protocol of Mozilla Firefox® and is not supported by Internet Explorer® browsers. The toolbar load 460 is further adapted to retrieve information from the script file 410, the HTML render object 430 and the toolbar libraries 440 stored in the local hard drive.

In accordance with one embodiment the cross-browser toolbar may be developed using asynchronous JavaScript and XML (AJAX) techniques while supporting scripting and programming languages including, for example, XML, HTML and JavaScript.

The embodiment disclosed herein can be implemented in hardware, software, firmware or any combinations thereof. The software may be implemented as an application program tangibly embodied on a program storage unit or computer readable medium. The application program may be uploaded to, and executed by, a machine comprising any suitable architecture, for example a computer platform having hardware such as one or more central processing units ("CPUs"), a random access memory ("RAM"), and input/output ("I/O") interfaces. The computer platform may also include an operating system and microinstruction code. The various processes and functions described herein may be either part of the microinstruction code or part of the application program, or any combination thereof, which may be executed by a CPU, whether or not such computer or processor is explicitly shown.

It is to be further understood that, because some of the constituent system components and methods depicted in the accompanying drawings are preferably implemented in software, the actual connections between the system components or the process function blocks may differ depending upon the manner in which the present invention is programmed. Given the teachings herein, one of ordinary skill in the pertinent art will be able to contemplate these and similar implementations or configurations of the present invention. All examples and conditional language recited herein are intended for pedagogical purposes to aid the reader in understanding the principles of the invention and the concepts contributed by the inventors to furthering the art, and are to be construed as being without limitation to such specifically recited examples and conditions.

All statements herein reciting principles, aspects, and embodiments of the invention, as well as specific examples thereof, are intended to encompass both structural and functional equivalents thereof. It is intended that such equivalents include both currently known equivalents as well as equivalents developed in the future, i.e., any elements developed that perform the same function, regardless of structure. Other hardware, conventional and/or custom, may also be included.

I claim:

1. A tool configured to build a cross-browser toolbar, comprising:
    a processor; and
    a memory coupled to the processor and configured to store at least instructions for execution of a wizard program by the processor, wherein the wizard program causes the tool to:
    receive an input identifying at least user interface elements and event handlers respective of the user interface elements, wherein the input further identifies at least two different types of a web browser on which the toolbar can be executed;
    generate respective of the received input a toolbar rendered object, a script file, and at least one toolbar library for each type of web browser; and
    wherein the toolbar rendered object defines the user interface elements of the cross-browser toolbar;
    compile the toolbar rendered object, the script file, and the at least one toolbar library into an installer file.

2. The tool of claim 1, wherein the toolbar rendered object is configured to render at least any one of: a hypertext markup language (HTML) web page and an XML user interface language (XUL) web page.

3. The tool of claim 1, wherein the script file defines event handlers associated with the user interface elements.

4. The tool of claim 1, wherein the at least one toolbar library includes at least application programming interfaces (APIs) and script files supporting one type of a web browser from the support types of web browsers.

5. The tool of claim 4, wherein the at least one toolbar library also include special tags defining special functions of the cross-browser toolbar, and wherein each of the special tags has a set of attributes for customizing a special function defined by the special tag.

6. The tool of claim 5, wherein the wizard program is further configured to assign a unique dynamic-link library (DLL) file to the at least one toolbar library and the script file depending on the type of web browser supported by the at least one toolbar library.

7. The tool of claim 4, wherein the APIs include at least an API bridge that provides an interface for communicating with other software applications executed on a local computing device.

8. The tool of claim 1, wherein at least one of the user interface elements is a widget, wherein the widget is any one of: a software application and a control executed from the toolbar.

9. The tool of claim 1, wherein the type of the web browser is any of: a Microsoft Internet Explorer, a Mozilla Firefox, Safari, Chrome, and an Opera.

10. A computer system including a processor and a memory coupled to the processor, the computer system is configured to generate a toolbar document object (TDO) data structure,
    wherein the TDO data structure enables an execution of a toolbar over different types of web browsers,
    wherein the TDO data structure includes a plurality of nodes arranged in a tree representation, wherein each node of the plurality of nodes defines a user interface element having any one of a special tag and a standard tag; and
    wherein the toolbar rendered object defines the user interface elements of the cross-browser toolbar.

11. The computer system of claim 10, wherein the special tag provides an enhanced toolbar function.

12. The computer system of claim 11, wherein the enhanced toolbar function includes any one of: a search-bar, a RSS button for accessing RSS feeds, a web inspector button for performing background anti-phishing checks, and a widget menu popup providing a list of widgets.

13. The computer system of claim 12, wherein the special tag includes a set of attributes allowing for customizing the enhanced toolbar function.

14. The computer system of claim 13, wherein the special tag is a user defined tag.

15. The computer system of claim 10, wherein the user interface element is a widget, wherein the widget is any one of a software application and a control executed from the toolbar.

16. The computer system 15, wherein the TDO data structure is created at runtime and stored at a local memory of the computing device.

17. The computer system 15, wherein the TDO data structure is further translated to a specific-browser document object model (DOM) of a web browser type on which the toolbar is being executed.

* * * * *